US011105217B2

(12) United States Patent
Pfeiffer et al.

(10) Patent No.: US 11,105,217 B2
(45) Date of Patent: Aug. 31, 2021

(54) TURBINE GENERATOR AND METHOD OF OPERATING A TURBINE GENERATOR

(71) Applicant: DEPRAG Schulz GmbH u. Co., Amberg (DE)

(72) Inventors: Rolf Pfeiffer, Amberg (DE); Gerd Zinn, Hirschau (DE)

(73) Assignee: DEPRAG Schulz GmbH u. Co., Amberg (DE)

( * ) Notice: Subject to any disclaimer, the term of this patent is extended or adjusted under 35 U.S.C. 154(b) by 0 days.

(21) Appl. No.: 17/074,104

(22) Filed: Oct. 19, 2020

(65) Prior Publication Data

US 2021/0033000 A1    Feb. 4, 2021

Related U.S. Application Data

(63) Continuation of application No. PCT/EP2019/060033, filed on Apr. 18, 2019.

(30) Foreign Application Priority Data

Apr. 20, 2018 (DE) .............................. 102018206158

(51) Int. Cl.
  *F01D 15/10* (2006.01)
  *F01D 25/16* (2006.01)
  (Continued)

(52) U.S. Cl.
  CPC ............. *F01D 15/10* (2013.01); *F01D 25/16* (2013.01); *F01D 25/183* (2013.01);
  (Continued)

(58) Field of Classification Search
  CPC ........ F01D 15/10; F01D 25/16; F01D 25/183; F16C 32/0417; F16C 2380/26;
  (Continued)

(56) References Cited

U.S. PATENT DOCUMENTS 4,254,312 A  *  3/1981  Migrin ................ B60C 23/0408
                                                                200/61.25
4,763,032 A       8/1988  Bramm et al.
  (Continued)

FOREIGN PATENT DOCUMENTS

DE           9215696 U1     3/1994
DE          10005246 C1    10/2001
  (Continued)

*Primary Examiner* — Charles Reid, Jr.
(74) *Attorney, Agent, or Firm* — Laurence A. Greenberg; Werner H. Sterner; Ralph E. Locher

(57) ABSTRACT

A turbine generator contains a turbine part and a generator part. The turbine contains a turbine wheel. A sealing arrangement is arranged between the turbine wheel and the generator part, the sealing effect of which varies during operation. The generator part further has a generator shaft, which is supported by an axial bearing configured as a magnetic bearing with two coils axially spaced apart from each other. A bearing ring is arranged between these coils with an axial distance from the coils. To ensure a safe operation, a setpoint value for the axial distance is varied to change the sealing effect of the sealing arrangement. Alternatively or additionally, it is provided that when a current threshold of a coil current is exceeded, a control signal is emitted to control the flow of the medium or the rotational speed.

15 Claims, 2 Drawing Sheets

(51) Int. Cl.
*F01D 25/18* (2006.01)
*F16C 32/04* (2006.01)
*F16J 15/447* (2006.01)

(52) U.S. Cl.
CPC ......... *F16C 32/0417* (2013.01); *F16J 15/447* (2013.01); *F16C 2380/26* (2013.01)

(58) Field of Classification Search
CPC ................ F16C 32/047; F16C 32/0489; F16C 2300/22; F16C 2360/00; F16C 32/0444; F16C 32/0442; F16J 15/447; F05D 2240/52; F05D 2240/51; F05D 2220/76; F05D 2250/80; F05D 2220/62; H02K 9/19; H02K 11/21; H02K 2205/03; H02K 7/09; H02K 7/1823; F02C 1/05
USPC .......................................................... 290/52
See application file for complete search history.

(56) References Cited

U.S. PATENT DOCUMENTS

| | | |
|---|---|---|
| 5,208,522 A | 5/1993 | Griepentrog et al. |
| 5,481,145 A | 1/1996 | Canders et al. |
| 5,522,694 A | 6/1996 | Bernhardt et al. |
| 6,373,156 B2 | 4/2002 | Suzuki et al. |
| 2013/0170943 A1 | 7/2013 | Jonsson et al. |

FOREIGN PATENT DOCUMENTS

| | | |
|---|---|---|
| DE | 69827318 T2 | 10/2005 |
| DE | 102008035086 A1 | 2/2010 |
| DE | 102012211578 B4 | 2/2015 |
| EP | 0150320 A1 | 8/1985 |
| EP | 0695873 A1 | 2/1996 |
| EP | 1930567 A2 | 6/2008 |
| WO | 8700360 A1 | 1/1987 |

\* cited by examiner

TURBINE GENERATOR AND METHOD OF OPERATING A TURBINE GENERATOR

CROSS-REFERENCE TO RELATED APPLICATION

This application is a continuation, under 35 U.S.C. § 120, of copending international application No. PCT/EP2019/060033, filed Apr. 18, 2019, which designated the United States; this application also claims the priority, under 35 U.S.C. § 119, of German patent application No. DE 10 2018 206 158, filed Apr. 20, 2018; the prior applications are herewith incorporated by reference in their entirety.

BACKGROUND OF THE INVENTION

Field of the Invention

The invention relates to a compact turbine generator with the features of the preamble of the independent generator claim. The invention further relates to a method for operating such a compact turbine generator with the features of the preamble of the independent method claim.

Such a turbine generator is described in published, European patent application EP 1 930 567 A2, for example. Such turbine generators are distributed by the applicant under the trade name "GET". The applicant's information brochure "GET Turbinenmotor—eine Innovation, die sich lohnt!" ("GET Turbine Generator—An Innovation Worthwhile!") contains further information on the design and fields of application of such turbine generators.

The turbine generator is used for the generation of electrical energy, especially for energy production/recovery from a medium, for example in industrial processes. The turbine generator is a unit consisting of an expansion turbine, in the following generally referred to as turbine part and a generator, in the following generally referred to as generator part. For energy production, a gaseous medium is generally passed through the turbine part and thus the generator part is driven to generate electrical energy. A direct use is possible, in which a pressure gradient in the medium is directly utilized. Besides this, there is also the possibility of an indirect use, in which such a turbine generator is used, for example, to recover energy from waste heat in a closed cycle process, for example in a so-called ORC process (Organic Rankine Cycle). An application field for this is, for example, the energy production from exhaust gas in a motor vehicle, as described in German patent DE 10 2012 211 578 B4.

The turbine generators are comparatively compact and designed for electrical outputs of—depending on the application—greater than or equal to 30 kW and up to a maximum of 300 kW. The diameter of a turbine wheel of the turbine part is—depending on the application—over 50 mm and under 500 mm and especially under 400 mm. The total length of the turbine generator, i.e. the length in axial direction of the turbine part plus the length of the generator part, is in the range between 350 mm and 1500 mm.

Depending on the application, small turbine generators are used, whose electrical output is only in the range of 30 kW to 200 kW and in which the turbine wheel comprises a correspondingly smaller diameter, for example between 50 and 400 mm. Depending on the fields of application, the exploitable pressure differences of the medium are below 1 bar, starting for example at 0.2 bar and extending to a maximum of several 10 bar, for example to a maximum of 100 bar. Furthermore, the temperatures of the gaseous media, from which the energy is generated, are in a range between minus 50° and 400° C., depending on the field of application, typically in the range between 0° and 250° C.

The turbine generator is characterized by a very high rotational speed during operation. The rotational speeds during operation are typically above 4,000 rpm. In particular, an operating rotational speed, i.e. a rotational speed for which the turbine generator is designed and which is also reached during operation, is in the range between 8,000 and 40,000 rpm.

For the medium flowing through the turbine part, depending on the specific application, different, sometimes aggressive media and, for example, also refrigerants are used.

The turbine part and the generator part extend along a common longitudinal axis and are typically connected by a common generator shaft. Between a turbine wheel of the turbine part, which rotates during operation, and a fixed housing part, a sealing arrangement, usually designed as a labyrinth seal, is arranged. Via leakage currents, the medium flowing through the turbine part can penetrate into an interior of the generator part. On the one hand, this leads to components of the generator part being exposed to the medium.

Furthermore, this also causes a pressure to build up in the generator part, which lies between the pressure at an inlet for the medium and the pressure at an outlet for the medium of the turbine part. The generator shaft is typically supported by a axial bearing and two radial bearings. Varying operating conditions can cause a change in pressure difference between a front side of the turbine wheel and a back side of the turbine wheel facing the generator part, thereby producing a varying axial force. The axial force is absorbed by the axial bearing.

BRIEF SUMMARY OF THE INVENTION

Based on the above, the invention is designed to enable a reliable operation of a turbine generator even under varying operating conditions.

According to the invention, the task is solved by a compact turbine generator with the features of the independent generator claim, as well as by a method for operating a compact turbine generator with the features of the independent method claim. The advantages and preferential designs listed below with respect to the turbine generator can also be applied analogously to the method.

The turbine generator is designed for rotational speeds of more than 4,000 rpm. It comprises the dimensions and characteristics as specified in the introduction to the description and is also designed and used for the purposes described therein. The turbine generator is especially designed for an operating rotational speed in the range between 8,000 and 40,000 rpm and is also operated at such rotational speeds. Furthermore, a turbine part comprises a diameter preferably in the range between 50 mm and 500 mm.

The turbine generator contains the turbine part and a generator part, which extend along an axis of rotation in an axial direction from the turbine part to the generator part. The generator part contains a rotating part and a fixed part. The turbine part contains a turbine wheel and an inlet and outlet for a medium, which flows through the turbine wheel during operation. The turbine part is preferably designed as a radial turbine with a radial inlet and an axial outlet or alternatively as an axial turbine, in which both the inlet and the outlet are axially oriented. Between the turbine part and a fixed (housing) part—depending on the design either a housing part of the turbine part (e.g. in an axial turbine) or a housing part of the generator part (e.g. in a radial turbine)—a sealing arrangement is provided, which seals the rotating turbine wheel against the fixed part during operation. Due to its principle and design, part of the medium flows over the sealing arrangement as leakage current during operation and penetrates, for example, into an interior of the generator part. Depending on the operating situation, the sealing effect of the sealing arrangement can vary during operation. The generator part also contains a generator shaft that includes at least one bearing ring. The bearing ring is preferably connected to the generator shaft as a separate component. The generator shaft extends into the turbine part and the turbine wheel is fixed to the generator shaft. The generator shaft is supported by an axial bearing designed as a magnetic bearing and typically by several radial bearings. The axial bearing can be arranged at different positions along the generator shaft. It is preferably located in the generator part, where it is particularly adjacent to the turbine part. Alternatively, it is arranged between a first radial bearing and a rotor or at the end of the generator part after the rotor.

The axial bearing generally contains two coils spaced apart from each other, namely one coil facing the generator part and one coil facing away from the generator part (on the turbine side). Viewed in the axial direction, the axial bearing therefore has a front (turbine side) and a rear (generator side) coil. Between the coils, at least one bearing ring is arranged with a respective axial distance to the coils. According to a preferred variant, the two coils are assigned to exactly one (single) bearing ring and are arranged on both sides directly, i.e. in particular without interposition of further components, to this one bearing ring with the respective distance.

Alternatively, it is also possible to have two bearing rings spaced from each other in the axial direction. Viewed in the axial direction, therefore, a front bearing ring on the turbine side and a rear bearing ring on the generator side are provided. For example, a stator/rotor of the generator is arranged between the two bearing rings. Each of the coils is assigned to exactly one bearing ring, wherein one coil is arranged in the axial direction before and the other coil in the axial direction after the bearing ring assigned to it. Preferably the front coil is arranged in axial direction in front of the front bearing ring and the rear coil in axial direction behind the rear bearing ring. In this alternative design, the axial bearing is therefore designed as a split axial bearing, in which the two coils of the axial bearing are assigned to the two bearing rings spaced apart from each other.

In the following, the invention is described without restriction of the generality in connection with the axial bearing with the one bearing ring and the coils arranged on both sides. The explanations apply equally to the alternative variant of a split axial bearing.

For the operation of the turbine generator in general and especially for the control of the axial bearing a control device is arranged. The control device is designed in such way that the axial distance between the at least one bearing ring and at least one of the coils is regulated to a setpoint value. The regulation of the distance between the at least one bearing ring and the other coil is typically automatically achieved by the constructive, mechanical fixed assignment between the individual bearing rings and the coils.

For this purpose, the control device is configured to apply a coil current to the coils during operation. The coils are designed for a maximum coil current. In order to ensure a reliable operation, the control device is furthermore designed to perform at least one and preferably both of the following now described variants.

According to a first variant, depending on the current operating condition, i.e. when a certain operating condition occurs, the setpoint, to which the axial distance between the bearing ring and the coils is regulated, is varied. By varying the setpoint value, the objective of influencing the sealing effect of the sealing arrangement and thus influencing the axial forces acting on the turbine wheel is achieved.

According to the second variant, if a current threshold for the coil current is exceeded, at least one of the two coils emits a control signal to control the flow of the medium or the rotational speed of the turbine generator. In this measure, the axial forces are influenced by control interventions on the side of the medium or by limiting the rotational speed.

Both measures serve to improve a reliable and safe operation of the turbine generator. They are based on the knowledge that the sealing effect of the sealing arrangement varies during operation, which leads to a change in a pressure difference between a front side of the turbine wheel and a rear side of the turbine wheel. The back of the turbine wheel is oriented towards the generator part. The sealing arrangement is usually designed in such way that during operation an effective equal pressure is built up on the front and the rear side of the turbine wheel, so that the generator shaft is mounted free of axial load or at least largely free of axial load during operation.

Ideally, therefore, no significant axial force should be applied on the bearing ring by the axial bearing and coils in order to keep it in a desired position. Varying operating conditions, such as rotational speed, mass flow, temperature and pressure, however, lead—especially during load changes, such as when starting or shutting down the turbine generator—to changes in the geometry of the turbine wheel and the sealing arrangement, so that their sealing effect varies. The variation in the sealing effect increases or decreases the leakage flow and thus also the pressure on the rear side. This has a direct influence on the effective differential pressure between the front and the rear of the turbine wheel. This causes a change in the axial force acting on the turbine wheel and thus on the generator shaft, which has to be absorbed by the axial bearing.

By regulating the axial bearing to the desired setpoint value, which is usually fixed for normal operating conditions, the changing axial force is absorbed by the axial bearing. For this purpose, the coil currents are adjusted appropriately, so that the two parts of the axial bearing offset in the axial direction are subjected to different coil currents, so that the bearing parts exert different axial forces on the bearing ring and thus on the generator shaft.

However, if the axial forces exerted on the generator shaft on the turbine side due to the varying sealing effect become too great, the coil current approaches the maximum coil current and a critical operating condition is reached. A further adjustment of the axial bearing to the specified setpoint value may then, under certain circumstances, no longer ensure proper bearing support and may result in failure and damage to the bearing.

The two measures described above avoid such a critical operating condition or at least ensure that the turbine generator is transferred to a safe condition. Preferably, different triggering criteria are used for the two measures. Preferably, the first variant with the change of the set point is carried out first and only in case of a critical condition the second variant is implemented. In the present case, in particular a distinction is made between a normal operating mode, an optimized operating mode and a safety mode.

In the normal operating mode, the axial bearing is regulated to a normal setpoint value for the distance specified by the manufacturer, for example, or alternatively the turbine generator is regulated to a maximum efficiency, wherein changes in the distance in a specified range are preferably permitted.

In the optimized operating mode, the measure is carried out according to the first variant and the setpoint value for the distance is changed. A first trigger criterion is preferably provided for this purpose.

In the safety mode, the measure is performed according to the second variant. The safety mode is initiated if one of the coil currents exceeds the specified current threshold.

In the safety mode, at least one of the two variants is provided. Especially if both variants are provided and executed, different current thresholds are preferably provided, namely a lower, first current threshold for the initiation of the first variant (changing the setpoint) and a higher, second current threshold for the initiation of the second variant (changing the flow conditions of the medium). Instead of absolute current threshold values of the coil currents, alternatively variables correlated with the coil currents, e.g. relative or absolute difference values between the coil currents or absolute or relative distance measures are used as (current) threshold values for the introduction of the measures.

Both the optimized mode and the safety mode are preferably switched back to the normal operating mode, if the operating parameters allow it, e.g. if the turbine generator changes to a quasi-fixed operating condition after a start-up. In the first variant, the transition from the optimized mode to the normal operating mode is preferably automatic, i.e. if namely—e.g. after reaching the fixed operating condition—the setpoint is automatically changed back towards the specified setpoint.

In a critical operating condition, the second-mentioned variant intervenes in a control of the rotational speed of the turbine generator or in a control of the flow conditions of the medium, so that the operating parameters, such as mass flow, pressure, rotational speed, temperature, change and are reduced in particular, in order to bring the turbine generator back to a safe operating condition.

In contrast, the first mentioned variant is based on the knowledge that the sealing effect of the sealing arrangement depends decisively on the distance and the gap size between the turbine wheel and the fixed housing part, in particular the fixed part of the generator part, in the area of the sealing arrangement.

This gap size is therefore preferably deliberately varied by varying the setpoint value for the axial bearing. By this measure, the bearing ring and with it the generator shaft is axially displaced relative to the fixed part of the generator part quasi actively via the axial forces exerted by the axial bearing. This directly affects the gap between the turbine wheel and the fixed part and thus the sealing effect.

The variation of the setpoint value is preferably chosen in such way that the sealing effect is changed in such way that an equalization of the pressure conditions on the front and the back of the turbine wheel is achieved in order to achieve the desired axial force-free or at least largely axial force-free bearing of the generator shaft.

In accordance with a preferential embodiment, the setpoint value is varied in such way that an alignment of the axial forces generated by the two coils is achieved.

Furthermore, the setpoint value is preferably varied within a maximum permissible working range, which lies in the range of ±0.5 mm. This means that the maximum permissible change in the distance value between the bearing ring and the respective coil, which is decisive for the setpoint value, lies within said working range.

In a preferential embodiment, the optimized operating mode performed by the variation of the setpoint is effected when—as a trigger criterion—a difference between the coil currents of the two coils of the axial bearing and/or an absolute value of these coil currents or a related variable exceeds a specified threshold.

The optimized operating mode is preferably initiated when the difference between the coil currents is greater than 20% or greater than 30% of the average coil current of the two coils (average value of the coil currents of the two coils). In particular, the optimized operating mode is initiated when the difference between the coil currents is between 20% and 60% of the average coil current.

Alternatively or additionally an absolute value of the coil currents is used as trigger criterion, for example if the coil current of one of the two coils is greater than 20%, greater than 30% and preferably in the range between 20% and 50% of the maximum permissible coil current.

Both tripping criteria are an indication of an increased axial force to be absorbed by the axial bearing.

Appropriately, the safety mode is initiated and the second variant is initiated when at least one of the coil currents of both coils is greater than 60% and in particular greater than 75% of the maximum permissible coil current, i.e. the current threshold as trigger criterion is in the ranges, preferably in the range between 60% and 85% of the maximum permissible coil current.

In general, the triggering threshold for the safety mode is higher than for the optimized mode.

For the second-mentioned measure, according to which a control signal is issued when the current threshold is exceeded, appropriately one or more of the following measures are initiated:

a) The mass flow of the medium is reduced, especially by controlling a flow valve for the medium or by bypassing the turbine part.
b) For example, the current rotational speed is limited to a given value or it is reduced.
c) The pressure conditions at the inlet and/or outlet of the turbine wheel are changed. This in turn is preferably done by controlling flaps or valves, or by changing higher-level process parameters of an upstream operating process that influences these pressure conditions.

The sealing arrangement is furthermore preferably designed as a labyrinth seal. In this case, annular webs of a sealing element preferably engage in corresponding annular grooves on the back of the turbine wheel.

A measuring device is generally provided to control and regulate the axial distance, which is used to determine said axial distance. Especially, at least one distance sensor is arranged, which measures a reference distance between a rotating part and a fixed part. The measurement is preferably effected in axial direction on a special measuring surface, which is formed for example by a measuring ring attached to the generator shaft. The distance sensor is connected to the fixed part of the generator part. The axial distance between the respective coil of the axial bearing and the bearing ring is therefore preferably measured indirectly via the distance measurement of this measuring arrangement.

Other features which are considered as characteristic for the invention are set forth in the appended claims.

Although the invention is illustrated and described herein as embodied in a turbine generator and a method of operating a turbine generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, components with the same effect are marked with the same reference signs.

Figure 1:
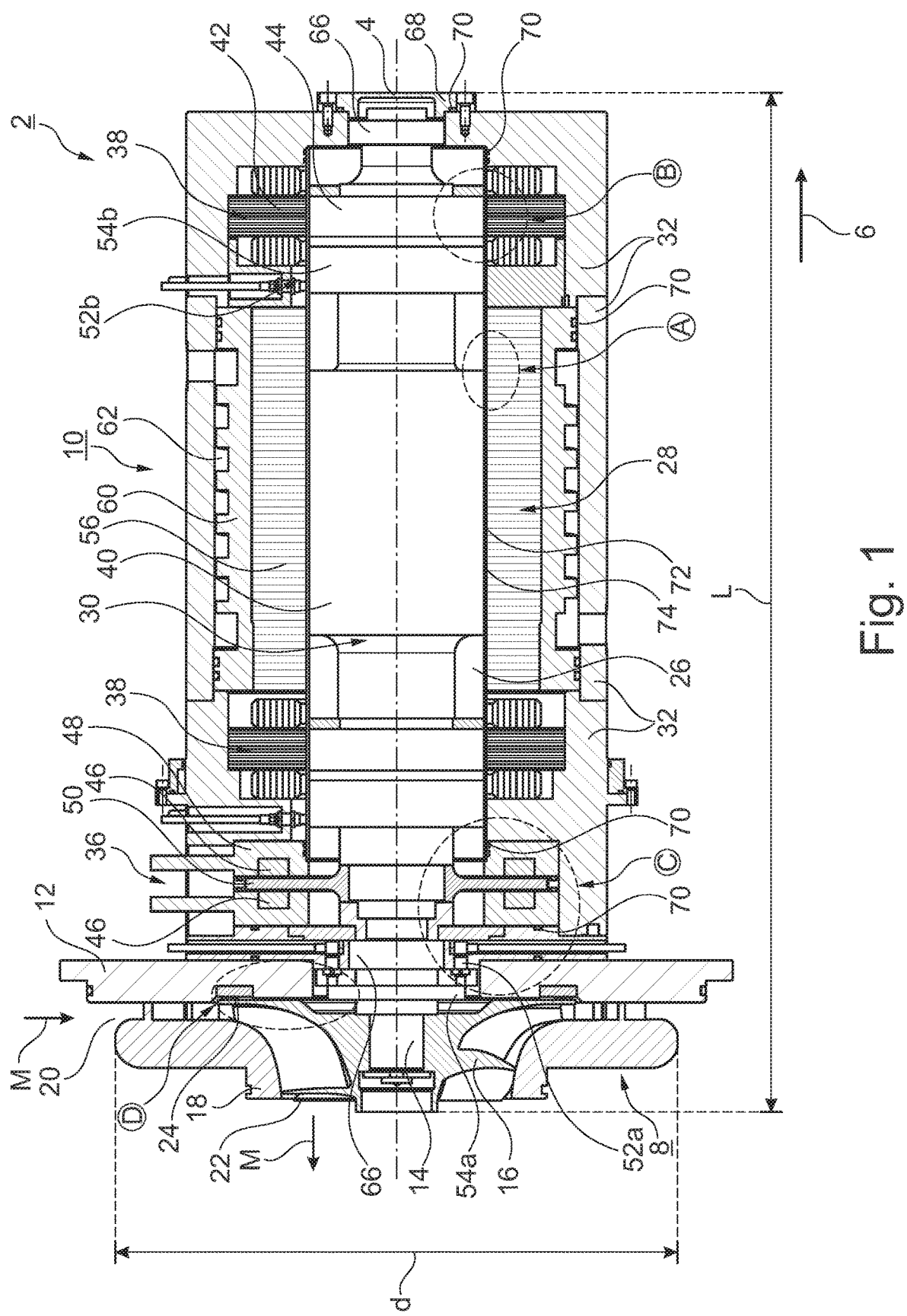
FIG. 1 is a diagrammatic, cross-sectional longitudinal view through a turbine generator according to the invention.

Referring now to the figures of the drawings in detail and first, particularly to FIG. 1 thereof, there is shown a turbine generator 2 that extends along an axis of rotation 4 in axial direction 6 and contains a turbine part 8 followed by a generator part 10. At its front end, the generator part 10 has an annular flange 12, by which it is attached to the turbine part 8.

The turbine part 8 and the generator part 10 have a common continuous generator shaft 14. A turbine wheel 16 is attached to the shaft in the turbine part 8, which has blades distributed around the circumference and encloses 18 flow channels to a turbine housing. During operation, a medium M is fed in via inlet 20, flows through the turbine part 8 and leaves it via outlet 22. The turbine part 8 shown in FIG. 1 is a radial turbine, in which the inlet 20 is oriented radially and the outlet 22 axially. Alternatively, the turbine part 8 is configured as an axial turbine, where the inlet 20 and the outlet 22 are axially oriented.

The turbine wheel 16 is sealed to the generator part 10 and to the fixed annular flange 12 by a sealing arrangement, which in the exemplary embodiment is designed as a labyrinth seal 24. As a result of leakage currents during operation, part of the medium M penetrates into an inner chamber 26 of the generator part 10. In this inner chamber 26 a pressure is built up, which is in the range between the pressure at the inlet 20 and the pressure at the outlet 22 of the medium M.

The generator part 10 generally contains a fixed part 28 and a rotating part 30. The fixed part 28 contains, among others, a generator housing 32 with the annular flange 12 already described.

The rotating part 30 is supported by a bearing arrangement, which in the exemplary embodiment contains an axial bearing 36 and two radial bearings 38. The axial bearing 36 is arranged between the annular flange 12 and the front radial bearing 38 on the turbine side. The rear radial bearing 38 supports the generator shaft 14 in its end part. A rotor 40 is arranged between the two radial bearings 38.

In the exemplary embodiment, the axial bearing 36 and the two radial bearings 38 are each designed as magnetic bearings. Due to the design as magnetic bearings, the radial bearings 38 contains a fixed outer part 42 and an inner part 44 which is fixed to the generator shaft 14 and rotates during operation.

The axial bearing 36 has two axially spaced coils 46, which are each enclosed in a coil housing 48. A bearing ring 50 is mounted on the generator shaft 14 and penetrates into the space between the two coils 46. A thin air gap is formed between one bearing ring 50 and each of the two coils.

According to an alternative variant, which is not shown here in detail, the axial bearing is designed as a split axial bearing, in which each of the two coils 46 is assigned its own bearing ring, which are spaced apart from each other. Starting from the situation shown in FIG. 1, the second bearing ring is arranged, for example, downstream of rotor 40 and, for example, in the area of the rear radial bearing 38, viewed in axial direction 6.

To check both the axial position and the radial position of the rotating part 30 relative to the fixed part 28, several position sensors are provided, namely at least one axial position sensor 52a, and in the exemplary embodiment at least two radial position sensors 52b. Said position sensors 52a,b each measure on a rotating measuring ring 54a,b of the rotating part 30. Preferably, two axial position sensors 52a, arranged offset to each other, are arranged on the circumference.

The rotor 40 is surrounded by a stator 56. The stator—in a manner not shown in detail here—contains coil windings, which are wound around coil cores designed as sheet metal packages. On its circumference the stator 56 is surrounded by a cooling jacket 60, which in turn contains cooling channels 62 on its outer circumference, through which coolant flows during operation. The cooling channels 62 are closed off to the outside by a housing sleeve of the generator housing 32. The housing sleeve has a coolant inlet and a coolant outlet.

The bearing arrangement further contains two axially spaced emergency bearings 66, which radially support the rotating part 30 to the generator housing 32, preferably at the opposite ends of the generator part 10, as shown in FIG. 1. They are used for emergency bearing, for example in case of a power failure. The right emergency bearing 66 shown in FIG. 1 is mounted in an end wall of the generator housing 32. This front wall contains a corresponding bearing bore hole, which is closed off to the outside by a cover 68. The cover is sealed to the front side of the generator housing 32, in particular by at least one O-ring 70.

A gap 72 is formed between the rotating part 30 and the fixed part 28. A sealing tube 74 is arranged in the gap. The sealing tube 74 preferably extends over the rotor 40 between the two radial bearings 38. The sealing tube 74 preferably extends over almost the entire axial length of the rotating part 30. In particular, the sealing tube 74 extends from the axial bearing 36 to the front side of the generator housing 32. The sealing tube 74 is fixed during operation and therefore belongs to the fixed part 28. It is sealed in the radial direction at its opposite ends by means of seals, which are especially designed as O-rings 70. At the front end, it is sealed off from the coil housing 48. At the right end, the sealing tube 74 enters a recess in the front wall of the generator housing 32 and is sealed radially to a surrounding wall area of the recess. The sealing tube 74 hermetically seals the fixed part 28 against the interior 26. Furthermore, the components arranged on the generator shaft 14 are sealed against the interior as well.

During operation, the medium M flows through the turbine part 8 and drives the turbine part as well as the generator shaft 14 and thus also the rotor 40 to generate electrical energy. The turbine wheel 16 rotates at a rotational speed in the range between 4,000 and 40,000 rpm. The turbine wheel has a diameter d which is between 50 mm and 500 mm, depending on the power rating. The entire turbine generator 2 has a length l, which is between 350 mm and 1500 mm, depending on the power rating.

Figure 2:
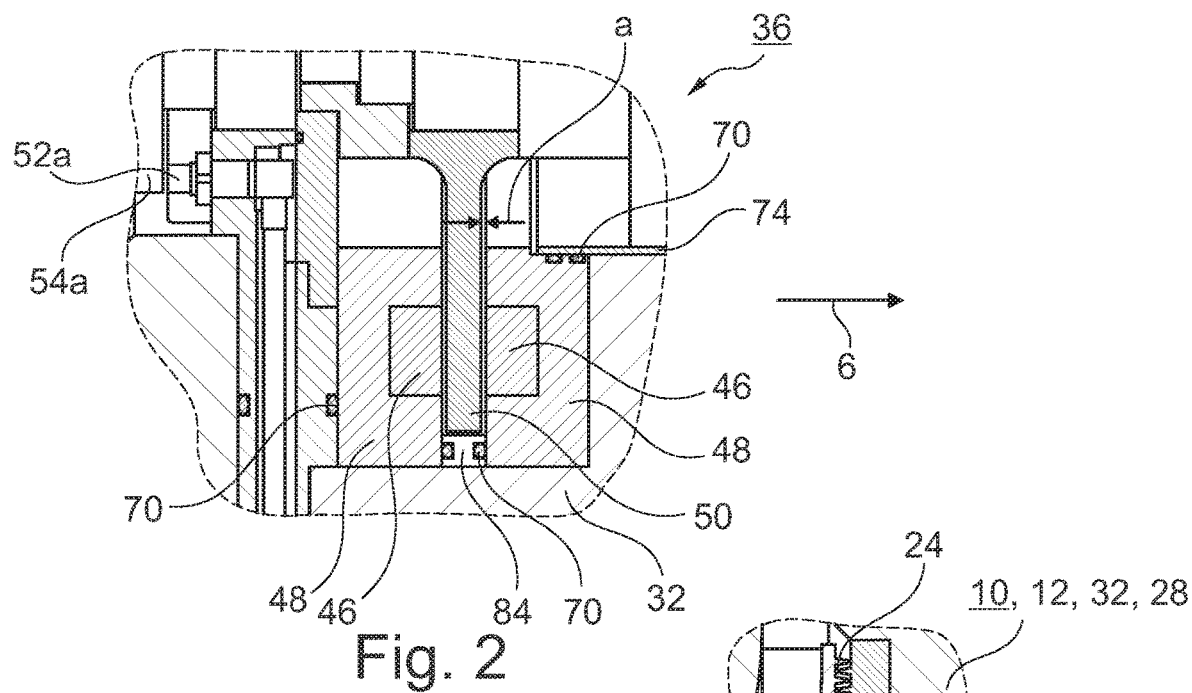
FIG. 2 is an enlarged sectional view of the axial bearing area marked with the letter C in FIG. 1.

The design of the axial bearing 36 can be identified from in FIG. 2. The two coils 46 are each arranged in a—viewed in a cross-section—approximately U-shaped coil housing 48. The bearing ring 50 penetrates into the space between the two coils 46. A distance a is formed between the bearing ring 50 and a respective coil 46. The coil housings 48 also seal the space between them in a radial direction. In the exemplary embodiment, an intermediate piece 84 is arranged for this purpose, which is designed as a ring that is connected to the bearing ring 50 on the circumference. The intermediate piece 84 is arranged between the two coil housings 48 and sealed with sealing elements, especially O-rings 70. The left coil housing 48 is further sealed by an O-ring 70 to another housing part of the generator housing 32.

The axial position sensor 52*a* records an axial distance value to the axial measuring ring 54*a*. This distance value is directly correlated to the distance a between the two coils 46 and the bearing ring 50. Due to the geometric conditions, the measured distance value can be clearly converted into the distance a, which is assumed by the turbine side coil 46 to the bearing ring 50 on the one hand and by the generator side coil to the bearing ring 50 on the other hand. The two distances can also differ. Under normal operating conditions, the distance is typically set so that the distance a to the two coils 46 is identical.

Figure 3:
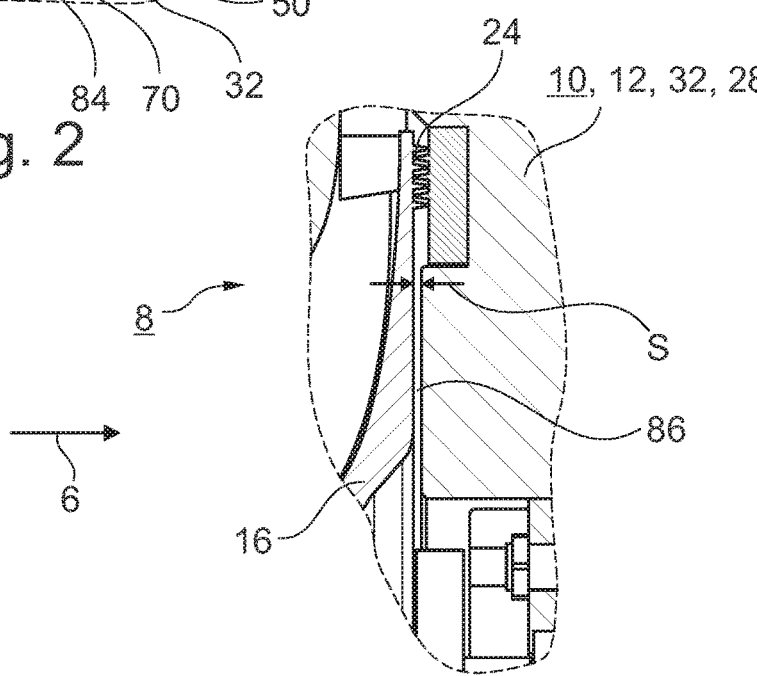
FIG. 3 is an enlarged section view of the area marked with the letter D in FIG. 1 with a labyrinth seal.

The enlarged illustration according to FIG. 3 clearly shows the labyrinth seal arrangement 24 between the turbine part 8 and the generator part 10. Between the turbine wheel 16 and the annular flange 12 a sealing element is arranged, which contains annular webs projecting in the axial direction. These annular webs engage in corresponding annular grooves on the back of the turbine wheel 16 and form the labyrinth seal 24 already mentioned. The annular webs and the annular grooves are only arranged in the outermost circumferential area of the turbine wheel 16. Between the turbine wheel 16 and the generator housing 32, i.e. especially the annular flange 12, a further gap 86 with a gap size s is formed. During operation, a leakage flow of the medium M flows through the labyrinth seal 24 and enters the inner chamber 26 via the further gap 86. The sealing effect of the labyrinth seal 24 is defined by a gap between the annular flanges and the annular grooves, which is not shown in detail here. This gap varies with a change in the gap size s of the gap 86 and is therefore correlated with the gap size s.

Figure 4:
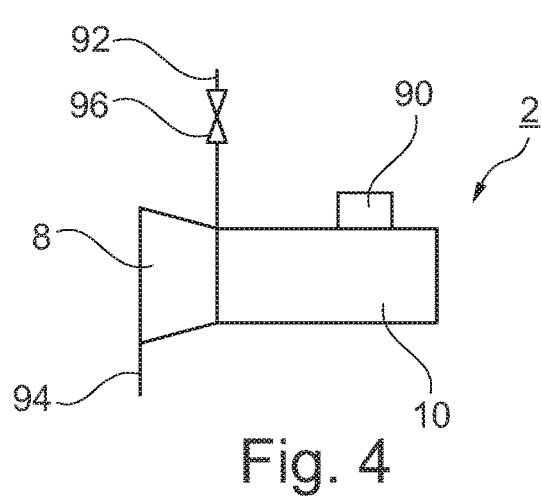
FIG. 4 is a highly simplified schematic diagram of the turbine generator with the inlet and outlet for the medium.

The simplified schematic diagram in FIG. 4 shows that a control unit 90 is assigned to the turbine generator 2, which is preferably a direct component of the turbine generator 2. A supply line 92 is connected to the turbine part 8 on the inlet side and a discharge line 94 for the medium M on the outlet side. As an example, FIG. 4 shows a flow valve 96 in the supply line 92. In general, such a valve can be arranged in addition or alternatively in the discharge line 94.

During operation, a pressure build up on the rear side of the turbine wheel 16 on the generator side and a differential pressure ratio is established between the front side of the turbine and the rear side of the turbine wheel 16. Different pressures result in an axial force acting on the turbine wheel 16 and the generator shaft 14. The sealing arrangement 24 is preferably configured in such way that during normal operation the pressure ratios on the front and rear sides are the same or as equal as possible, so that no or as little differential pressure as possible is formed. As a result, no or as little as possible axial force is generated and the axial bearing 36 has to absorb no or only small axial forces.

During operation, varying process parameters, such as varying rotational speeds, varying pressure ratios, varying flow rates, varying temperatures, etc., can cause the gap size s between the turbine wheel 16 and the annular flange 12 to vary. Varying process parameters, i.e. unsteady operating conditions, occur for example during start-up. These can lead to a slight bending of the turbine wheel 16, which has a direct influence on the gap size s and the sealing effect of the labyrinth seal 24. As a result, the leakage current flowing across the wider gap 86 changes, which leads to a change in the pressure conditions and especially in the pressure difference between the front and the rear of the turbine wheel 16 and finally to a resulting axial force on the generator shaft 14. In order to continue to ensure a reliable operation of the turbine generator 2 at the very high rotational speeds, such an axial force has to be absorbed by the axial bearing 36. For this purpose, a control unit 90 is first integrated in the control unit 90, which controls the coil currents of the two coils 46 accordingly, in order to adjust the distance a between the respective coils 46 and the bearing ring 50 to a desired setpoint value. The distance is preferably selected in such way that the bearing ring 50 is positioned exactly in the middle between the coils 46.

In order to ensure a safe operation even if the gap size s is changed and the sealing effect of the labyrinth seal and thus the axial forces are changed, the switching to the optimized operating mode and, if necessary, also to the safety mode is provided. The control device 90 first switches from a normal operating mode to the optimized operating mode, if, for example, a difference in the coil currents of the coils 46 of the axial bearing 36 is greater than 20% or greater than 30% of an average value of the coil currents of the two coils 46. If this measure is not sufficient, the safety mode is preferably initiated when a special safety-critical operating situation is reached. In particular, the control device switches to the safety mode and emits the control signal S, if one of the two coil currents of the two coils 46 exceeds a predetermined threshold, also called current threshold, of e.g. 75% of a maximum permissible coil current.

In the optimized mode, the setpoint for distance a is changed. As a result of the control algorithm, this leads to the fact that a change in the coil currents deliberately generates an axial force, so that the bearing ring 50 and thus the entire generator shaft 14 is displaced in—or against the axial direction 6 relative to the fixed part 28. This leads directly to an axial relative displacement between the turbine wheel 16 and the annular flange 12 and thus to a change in the gap size s. This has a direct influence on the sealing effect of the labyrinth seal 24 and thus on the pressure conditions. The change in the setpoint value for the distance a is such that—depending on the current operating situation—the gap size s is increased or reduced in such way that the coil currents of the two coils 46 match. If, for example, the operating situation causes the gap size s to increase initially, so that the pressure on the back side increases and an axial force is exerted against the axial direction 6, the new setpoint value a is set in such way that the gap size s is reduced again. This means that the bearing ring 50 is deliberately displaced by the axial bearing in the axial direction 6 to the turbine part 8.

If a reduction of the gap size s occurs during normal operation, the method is reversed accordingly.

This measure therefore directly influences the sealing effect of the labyrinth seal 24 by varying the setpoint value for the distance a, preferably in the direction of a bearing as free of axial forces as possible, or it is regulated to a maximum efficiency of the turbine generator 2.

Alternatively to the optimized mode, only the safety mode is provided. However, the safety mode is preferably provided as a supplement. In this mode, a control signal S is emitted by the control device 90, with which, for example, the flow valve 96 is controlled in order to reduce the mass flow for the medium M, for example. Alternatively or additionally, the rotational speed of the turbine generator 2 is limited by the control device. By intervening in the flow of the medium M or in the rotational speed, a change in the critical pressure conditions at turbine wheel 16 is achieved and thus the axial forces caused by a differential pressure are also reduced.

As mentioned above, both variants are used in particular in combination, wherein first—when the first trigger criterion is reached—the setpoint value is varied. As this can only be varied within a limited range, as a distance has to remain between the coils and the bearing ring 50, the additional measure according to the second variant may become necessary in unfavourable situations. Therefore, this additional measure is initiated in particular if the setpoint has already reached a maximum permissible value and additionally the second trigger criterion, i.e. the exceeding of the current threshold for the coil current, is exceeded.

LIST OF REFERENCE SIGNS 2 turbine generator
4 axis of rotation
6 axial direction
8 turbine part
10 generator part
12 annular flange
14 generator shaft
16 turbine wheel
18 turbine housing
20 inlet
22 outlet
24 labyrinth seal
26 interior
28 fixed part
30 rotating part
32 generator housing
36 axial bearing
38 radial bearing
40 rotor
42 outer part
44 inner part
46 coils
48 coil housing
50 bearing ring
52a axial position sensor
52b radial position sensor
54a axial measuring ring
54b radial measuring ring
56 stator
60 cooling jacket
62 cooling channels
66 emergency bearing
68 cover
70 O-ring
72 gap
74 sealing tube
76 protective housing
86 further gap
90 control device
92 supply line
94 discharge line
96 flow valve
l length -continued d diameter
a distance
M medium
s gap size
S control signal

The invention claimed is:

1. A turbine generator for rotational speeds greater than 4,000 rpm, comprising:
a turbine part having a turbine wheel, an inlet and an outlet for a medium;
a generator part, the turbine generator extending along an axis of rotation from said turbine part to said generator part, wherein said generator part having a rotating part and a fixed part with a fixed housing part;
a sealing configuration disposed between said turbine wheel and said fixed housing part;
an axial bearing configured as a magnetic bearing;
said generator part having a generator shaft with at least one bearing ring, said generator shaft is mounted via said magnetic bearing and, for this purpose, said magnetic bearing having two coils axially spaced apart from each other, between which said at least one bearing ring is disposed at a respective axial distance from said two coils; and
a controller for controlling said axial bearing and configured in such a way that the respective axial distance between said at least one bearing ring and one of said two coils is regulated to a setpoint value and for this purpose said controller is set up to apply a coil current to said two coils during operation, said two coils being configured for a maximum coil current,
wherein said controller is further configured in such way that said controller initiates at least one of the two following measures as required, namely:
varying the setpoint value in such way that a sealing effect of said sealing configuration is changed; and/or
if a current threshold for the coil current is exceeded, a control signal is emitted to control a flow of the medium or a rotational speed of the turbine generator.

2. The turbine generator according to claim 1, wherein a gap size between said turbine part and said fixed housing part in an area of said sealing configuration is changed by a change of the setpoint value.

3. The turbine generator according to claim 1, wherein:
during operation axial forces are generated via said two coils respectively, which act on said at least one bearing ring; and
said controller is configured in such way that the setpoint value is regulated in such way that an alignment of the axial forces generated by said two coils is effected.

4. The turbine generator according to claim 1, wherein a maximum permissible change in a range of +/−0.5 mm is specified for a change of the setpoint value.

5. The turbine generator according to claim 1, wherein said controller is configured in such way that a variation of the setpoint value is effected, if a difference between coil currents and/or an absolute value of at least one of the coil currents exceeds a predetermined threshold.

6. The turbine generator according to claim 1, wherein said controller is configured in such way that a variation of the setpoint value is effected, if a difference between coil currents is greater than 20%.

7. The turbine generator according to claim 1, wherein the current threshold for an output of the control signal is in a range between 60% and 85% of a maximum permissible coil current.

8. The turbine generator according to claim 1, wherein said controller is disposed in such way that when the current threshold is exceeded at least one of the following measures is initiated via the control signal:
reducing a flow rate of the medium by controlling a flow valve for the medium;
limiting and/or reducing a current rotational speed; and
hanging pressure conditions at said inlet and/or said outlet.

9. The turbine generator according to claim 1, wherein said sealing configuration is formed as a labyrinth seal.

10. The turbine generator according to claim 1, wherein the turbine generator is configured for an operating at a rotational speed in a range between 4,000 and 40,000 rpm.

11. The turbine generator according to claim 1, wherein said turbine part has a diameter in a range between 50 mm and 500 mm.

12. The turbine generator according to claim 1, wherein said controller is configured in such way that a variation of the setpoint value is effected, if a difference between coil currents is greater than 30%.

13. The turbine generator according to claim 1, wherein said controller is configured in such way that a variation of the setpoint value is effected, if a difference between coil currents is a range between 20% and 60% of an averaged coil current of the two coils.

14. The turbine generator according to claim 1, wherein the current threshold for an output of the control signal is at 75% of a maximum permissible coil current.

15. A method for operating a turbine generator having a turbine part and a generator part and extending along an axis of rotation from the turbine part to the generator part, the generator part having a rotating part and a fixed part and the rotating part rotating at a rotational speed of more than 4,000 rpm, the generator part further having a generator shaft with at least one bearing ring, the turbine part containing a turbine wheel, an inlet and an outlet for a medium, and the medium flows in via the inlet and flows out via the outlet, which comprises the steps of:
disposing a sealing configuration between the turbine part and a fixed housing part;
mounting the generator shaft via the at least one axial bearing configured as a magnetic bearing and, for this purpose, the axial bearing containing two coils axially spaced apart from each other, between which the at least one bearing ring is disposed at a respective axial distance from the two coils;
regulating the respective axial distance between the at least one bearing ring and one of the two coils to a setpoint value and for this purpose a coil current is applied to the two coils, wherein the two coils are configured for a maximum coil current; and
carrying out at least one of the following measures:
varying the setpoint value in order to change a sealing effect of the sealing configuration; and/or
upon exceeding a current threshold for a coil current, emitting a control signal to control a flow of the medium or the rotational speed of the turbine generator.

* * * * *